March 24, 1959 H. M. PETERS 2,879,088
COUPLING
Filed Sept. 3, 1957
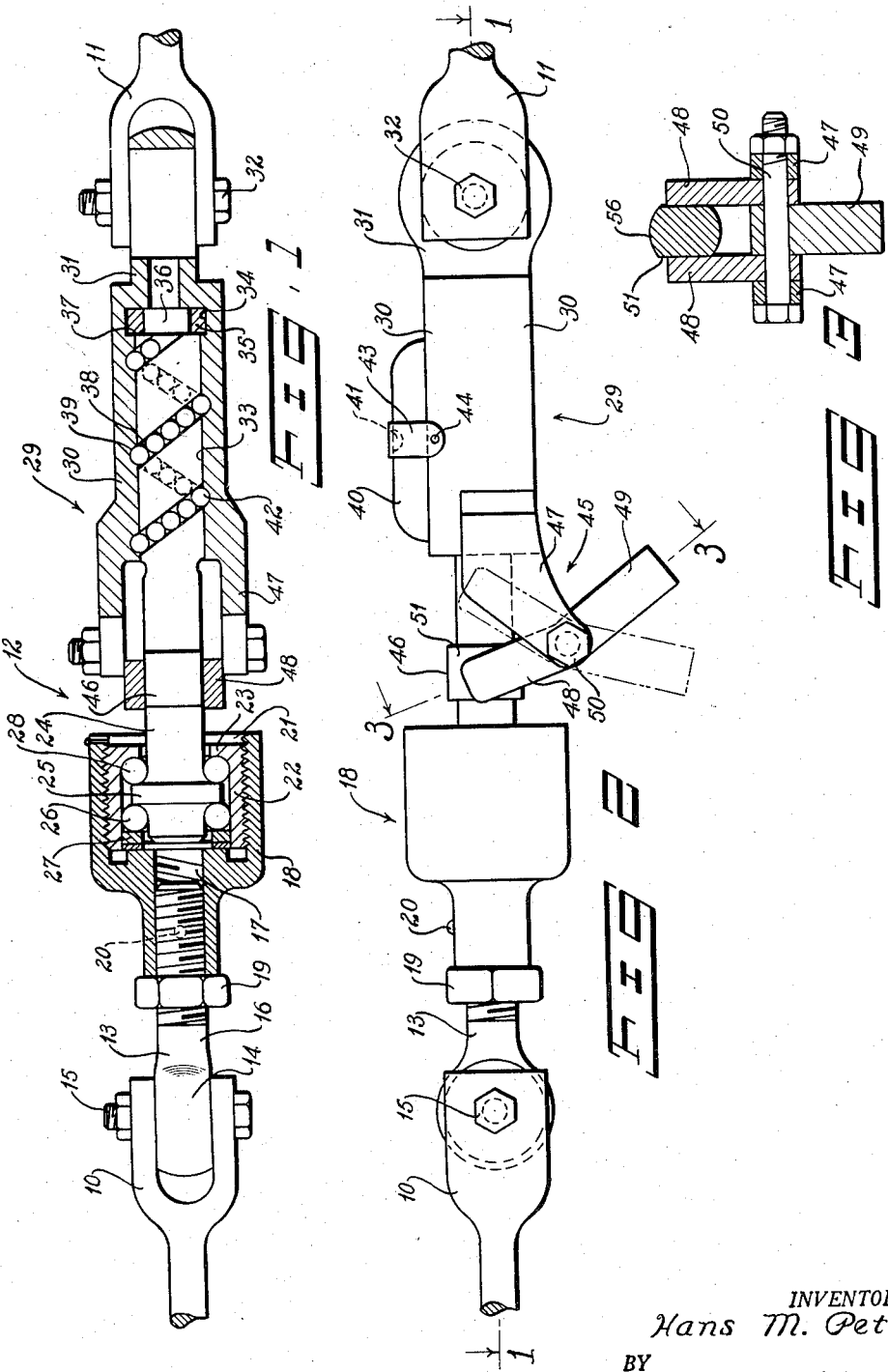
INVENTOR.
Hans M. Peters
BY
Franz O. Ohlson Jr.
ATTORNEY.

United States Patent Office 2,879,088
Patented Mar. 24, 1959

2,879,088

COUPLING

Hans M. Peters, Huntington Station, N.Y., assignor to Republic Aviation Corporation, Farmingdale, N.Y., a corporation of Delaware Application September 3, 1957, Serial No. 681,723

8 Claims. (Cl. 287—61)

This invention relates in general to couplings and more particularly to an adjustable coupling for releasably interconnecting the adjacent or complemental ends of a pair of load or force transmitting members such as rods, links or cables.

While the instant invention may have general utility, it is particularly adapted for use in a push-pull rod system or linkage where it serves to releasably interconnect the adjacent or complemental ends of a pair of rods or links of the system.

Among other objects the present invention contemplates a coupling the elements of which are constructed and arranged for positive and quick separation or disconnection and which are adjustable relatively to each other whereby the overall length of the coupling may be varied.

With the above and other objects in view as will become apparent, the present invention consists of the combination and arrangement of parts all as hereinafter more fully described, claimed and illustrated in the accompanying drawings, wherein:

Fig. 1 is a longitudinal section through the coupling contemplated herein, taken along the line 1—1 in Fig. 2;

Fig. 2 is a side elevation of the instant coupling; and

Fig. 3 is a section taken along line 3—3 of Fig. 2.

Referring now to the drawings 10 and 11 designate the adjacent clevis ends of a pair of complemental rods or links of a push-pull rod system or linkage, not shown, releasably interconnected by the coupling 12 contemplated herein.

The coupling 12 comprises a bolt or fitting 13 having an eye or ring portion 14 at one end thereof that is adapted to be inserted within the clevis 10 and to be pivotally secured thereto by means of a pintle or a bolt 15. The shank 16 of the eye-bolt 13 is externally threaded for engagement within an internally threaded, axial socket 17 formed in one end of a bearing housing 18. A locknut 19 is mounted on the threaded shank 16 of the eye-bolt 13 for engagement with the adjacent end of the housing 18 to prevent relative movement between the eye-bolt 13 and the housing 18. If desired, additional securing or locking means may be provided such as a set-screw 20. The end of the housing 18 opposite to that which carries the bolt 13, is provided with an opening 21 in axial alignment with the socket 17. The opening 21 is internally threaded to receive an externally threaded sleeve 22 having an inwardly extending flange 23 at its outer end.

A shaft 24 is mounted at one of its ends within the sleeve 22 for free rotation about its longitudinal axis and in axial alignment with the bolt 13. To these ends, the shaft 24 is provided adjacent one end thereof with an outwardly projecting collar 25 that is adapted to be seated or positioned within the sleeve 22. The opposing side walls of the collar 25 are formed with suitable radii so that a first set of ball-bearings 26 may be disposed around the shaft 24 and between one side of the collar 25 and a thrust washer 27 positioned against the end wall of the socket 21 and a second set of ball-bearings 28 may be similarly disposed about the shaft 24 and between the other side of the collar 25 and the inwardly extending flange 23 of the sleeve 22. To further accommodate the ball-bearing 28, the inner wall of the flange 23 is also formed with a suitable radius. The foregoing elements are so constructed and arranged that while the shaft 24 is restrained against longitudinal movement within the housing 18, at the same time it is free to rotate about its longitudinal axis.

As above set forth, one end of the shaft 24 is rotatably mounted in the sleeve 22 carried by the housing 18. The remainder of the shaft 24 projects through the opening in the end of the sleeve 22, defined by the inwardly extending flange 23, and is adapted adjacent its outer end for association with a re-circulating ball-type nut 29.

As shown more particularly in Fig. 1, the nut 29 comprises a body 30 having an extension 31 at one end for insertion within the clevis 11 and which is pivotally connected to the clevis 11 by a bolt or pintle 32. The opposite end of the nut-body 30, i.e., the end adjacent the housing 18, is provided with an axial bore 33 at the inner end of which is formed an annular groove 34 in which is seated a split washer 35. The shaft 24 is adapted to be received within the bore 33 and the outer extremity 36 of the shaft 24 is reduced in diameter to be received within the central opening of the washer 35. Moreover, when the nut-body 30 is mounted on the shaft 24 upon the assembly of the coupling 12, as shown in Fig. 1, a shoulder 37 formed at the junction of the shaft 24 and its reduced end portion 36 bears against the adjacent side of the washer 35.

The portion of the shaft 24 received within the bore 33 is provided with a helical groove 38 and a complemental helical groove 39 is formed in the wall of the nut-body 30. The grooves 38 and 39 are each semi-circular in cross-section so that when the shaft 24 is positioned within the bore 33 they cooperate to define a channel 38—39 that is substantially circular in cross-section. The opposite ends of the helical groove 39, and hence the opposite ends of the channel 38—39, are interconnected with each other by means of a tubular guide 40 carried by the nut-body 30. Medially of its length, the tubular guide 40 has an opening 41 formed therein whereby a plurality of ball-bearings 42 may be inserted in and completely fill the channel 38—39 and the tubular guide 40. The opening 41 is normally closed by a spring-clip or closure 43 that is secured to the nut body 30 by a screw 44 or any other suitable means.

When the ball-bearings 42 are disposed in the channel 38—39 and the guide 40, they serve to interconnect the shaft 24 and nut 29 in such a manner that axial loads on the coupling 12, i.e., loads on either the housing 18 or the nut 29, or both of these elements, which tend to move them toward or away from each other on the longitudinal axis of the coupling 12, are transmitted through the ball-bearings 42 to the shaft 24 so as to cause the shaft 24 to rotate about its axis. When the coupling 12 is assembled, as shown in Fig. 1, the shoulder 37 on the shaft 24 is engaged with the side of the washer 35. Therefore, axial loads in compression on the coupling 12, i.e., loads tending to move the housing 18 and nut 29 toward each other, are transmitted through the nut-body 30 and the washer 35 to the shoulder 37 and thence to the shaft 24. Since, as above set forth, the end of the shaft 24 mounted in the housing 18 is fixed against axial movement, under these conditions, i.e., under axial compression of the coupling 12, no forces or loads are transmitted to or through the ball-bearings 42 to the shaft 24. However, axial loads in tension on the coupling 12 such as would cause the housing 18 and/or the nut 29 to move away from each other, are transmitted through the ball-bearings 42 to the shaft 24 and cause it to rotate about its axis thereby moving the shaft 24 out of the axial bore 33 in the nut 29 thereby resulting in a disconnection of the coupling 12. As the shaft 24 rotates and moves out of the nut 29, the ball-bearings 42 circulate through the channel 38—39 and the guide 40 and drop into the bore 33 behind the end 36 of the shaft 24 as it moves out of the bore 33. Upon the complete withdrawal or disengagement of the shaft 24, the ball-bearings 42 may then drop out of the open end of the bore 33 in the nut-body 30. However, since the complete disconnection of the coupling has been effected by that time, there is no interference with the operation of the coupling 12.

To prevent the rotation of the shaft 24, and the disconnection of the coupling 12 as aforesaid, until such time as it is desired, the nut 29 is provided with a latch assembly 45 that is adapted to engage a boss or stop 46 formed on the shaft 24 and prevent its rotation in response to axial tension loads on the coupling 12. As shown more particularly in Figs. 2 and 3, the latch asembly 45 comprises a pair of spaced brackets 47 that are formed integrally with the nut-body 30 and which extend outwardly from the end of the nut-body 30 in the direction of the housing 18. A pair of spaced arms 48 are joined by any suitable means, such as welding, to an actuating arm 49 to form an integral unit. The arms 45 and the actuating arm 49 are pivotally mounted in and between the spaced brackets 47 by a bolt 50.

The boss 46 is so disposed on the shaft 24 that when the coupling 12 is assembled, i.e., as shown in Figs. 1 and 2, the spaced arms 48 are engageable with flat surfaces 51 formed on diametrically opposite sides of the boss 46. When the arms 48 are thus engaged with the flat surfaces 51 on the boss 46, as shown in solid lines in Fig. 2 and in the section comprising Fig. 3, the shaft 24 is restrained from rotation about its longitudinal axis. Thus, under these conditions axial tension loads on the coupling 12 do not result in the rotation of the shaft 24 and a disconnection of the coupling 12, as aforesaid. However, when the actuating arm 49 is moved in a clockwise direction the spaced arms 48 also move in the same direction to disengage from the flat surfaces 51 of the boss 46 as shown in phantom lines in Fig. 2. The shaft 24 is then free to rotate about its longitudinal axis to the end that an axial tension load will cause the disconnection of the coupling 12 as hereinbefore set forth.

In utilizing the coupling 12 to interconnect the adjacent clevis 10 and 11 of a linkage system, the coupling 12 is assembled as above set forth. The nut 29 is then pivotally mounted to the clevis 11 by inserting the extension 31 thereof within the clevis 11 and positioning and securing the pintle or bolt 32 in place. The lock-nut 19, and the set-screw 20, if used, are then loosened to permit the rotation of fitting 13 in the socket 12 of the housing 18. By rotating the fitting 13 the over-all length of the coupling 12 is adjusted or varied to the end that the eye 14 of the fitting 13 is received within the clevis 10 where it is pivotally joined thereto by the pintle or bolt 15. The lock-nut 19 is then rotated on the shaft 16 of the fitting 13 until it engages the end of the housing thereby locking the fitting 13 against further rotary movement relative to the housing 18. If used, the set-screw 20 is then turned into locking position.

What is claimed is:

1. A releasable coupling comprising a housing, a shaft rotatably mounted at one of its ends in said housing and restrained against axial movement relative to said housing, a recirculating ball-type nut mounted on and engaged with the opposite end of said shaft, said nut and the end of the shaft engaged therewith being adapted to permit rotation of said shaft within said nut and to cause the disengagement thereof in response to an axial tension load on the coupling, and means engageable with said shaft to prevent the rotation of said shaft within said housing and nut.

2. A releasable coupling comprising a housing, a shaft mounted at one of its ends in said housing for rotation about its longitudinal axis and restrained against axial movement along said axis relative to said housing, a recirculating ball-type nut mounted on and engaged with the opposite end of said shaft, said shaft being rotatable within said nut in response to an axial tension load on said coupling to thereby disengage said nut from the end of said shaft engaged therewith, and means to prevent the rotation of said shaft within said housing and nut.

3. A releasable coupling comprising a housing, a shaft adapted at one of its ends to be received in said housing and having a free end extending axially from said housing, means carried in part by said housing and in part by said one end of said shaft for mounting said shaft within said housing for rotation about its longitudinal axis and to restrain said shaft against axial movement relative to said housing, a helical groove formed in the free end of said shaft, a recirculating ball-type nut engaged with said helical groove whereby axial tension loads on the coupling cause said shaft to rotate in said nut to thereby disengage said nut and said shaft, and means carried in part by said shaft and in part by said nut to prevent the rotation of said shaft within said housing and nut as aforesaid.

4. A releasable coupling for interconnecting the adjacent ends of a pair of links, comprising a housing adapted at one end for pivotal attachment to the end of one of said links, a shaft rotatably mounted at one of its ends in the other end of said housing for rotation about the longitudinal axis of the coupling and restrained against movement on said axis relative to said housing, a recirculating ball-type nut adapted at one end for pivotal connection with the end of the other of said links and at its other end for engagement with the opposite end of said shaft, said nut and the end of the shaft engaged therewith being adapted to permit the rotation of said shaft within said nut to cause a disengagement of said shaft from said nut in response to an axial tension load on the coupling, a stop carried by said shaft, and a latch assembly carried by said nut for selective engagement with or disengagement from said stop to prevent or permit the rotation of said shaft within said housing and nut as aforesaid.

5. A releasable coupling for interconnecting the adjacent ends of a pair of links, comprising a housing adapted at one end for connection with the end of one of said links, a shaft, means carried in the opposite end of said housing for receiving one end of said shaft, means on said shaft cooperating with the means carried in said housing for rotatably mounting said end of the shaft in said housing for rotation about its longitudinal axis and to restrain said shaft against axial movement on said axis relative to said housing, the remainder of said shaft extending axially outward from said housing and having a helical groove formed therein adjacent the opposite end of said shaft, a recirculating ball-type nut engaged with the grooved portion of said shaft and cooperating therewith whereby axial tensional loads on the coupling rotate said shaft and disengage its grooved portion from said nut, a stop carried by said shaft, and a latch carried by said nut for engagement with said stop to prevent the rotation of said shaft within said housing and nut and for disengagement from said stop to permit such rotation as aforesaid.

6. A releasable coupling comprising a shaft, means mounting one end of said shaft for rotation about its longitudinal axis and to restrain it from movement along said axis relative to said mounting means, second means mounting the opposite end of said shaft for rotation about its longitudinal axis and adapted for disconnection from said shaft upon said rotation thereof, and means to prevent the rotation of said shaft in said first and second mounting means.

7. A coupling comprising a shaft, first means mounting one end of said shaft for rotation about its longitudinal axis and restraining it against movement along said axis relative to said first mounting means, second means mounting the opposite end of said shaft for rotation about its longitudinal axis, said shaft and second mounting means being adapted for disconnection upon the rotation of said shaft in response to an axial tension load imposed on the coupling, and means to restrain said shaft from rotating in said first and second mounting means.

8. A releasable coupling comprising a shaft, first means supporting one end of said shaft for rotation about its longitudinal axis and restraining it from movement along said axis relative to said mounting means, second supporting means associated with the other end of said shaft in axial alignment with said first supporting means, said second supporting means and the end of the shaft associated therewith being adapted to rotate said shaft within both said first and second supporting means in response to axial tension loads on the coupling to thereby disengage said shaft from said second supporting means, and means operative between said shaft and said second supporting means for selectively preventing or permitting the rotation of said shaft as aforesaid.

References Cited in the file of this patent

UNITED STATES PATENTS

| | | |
|---|---|---|
| 601,451 | Stevenson | Mar. 29, 1898 |
| 624,122 | Stevenson | May 2, 1899 |
| 1,181,734 | Burns | May 2, 1916 |
| 1,618,851 | Thunberg et al. | Feb. 22, 1927 |